United States Patent [19]

Schmitzek

[11] Patent Number: 5,306,875
[45] Date of Patent: Apr. 26, 1994

[54] WEIGHING ARRANGEMENT FOR A MEAT PACKING FACILITY

[75] Inventor: Peter Schmitzek, Geilenkirchen, Fed. Rep. of Germany

[73] Assignee: CSB-System Software-Entwicklung & Unternehmensberatung GmbH, Geilenkirchen, Fed. Rep. of Germany

[21] Appl. No.: 871,853

[22] Filed: Apr. 21, 1992

[30] Foreign Application Priority Data

Apr. 26, 1991 [DE] Fed. Rep. of Germany ....... 4113619

[51] Int. Cl.[5] ............................................. G01G 19/40
[52] U.S. Cl. .................... 177/25.15; 177/145
[58] Field of Search ............................ 177/25.15, 145

[56] References Cited

U.S. PATENT DOCUMENTS

| 3,716,697 | 2/1973 | Weir | 177/1 X |
| 4,365,148 | 12/1982 | Whitney | 177/4 X |
| 4,879,650 | 11/1989 | Kurimoto et al. | 177/25.15 X |
| 5,052,504 | 10/1991 | Ikeda et al. | 177/25.15 |

Primary Examiner—George H. Miller, Jr.
Attorney, Agent, or Firm—Darby & Darby

[57] ABSTRACT

A meat packing facility has several scales for weighing meat. All of the scales are connected to a central station which serves to display, monitor, store and process weight data from the scales. The central station comprises a personal computer, a monitor and a keyboard which are mounted on a rack. Hardware associated with the scales generates protocols for the latter. The protocol for each scale includes the respective weight data in digital form as well as identifying data for the scale. The protocols are sent to the central station where the identifying data are used to link weight data to a particular scale.

20 Claims, 1 Drawing Sheet

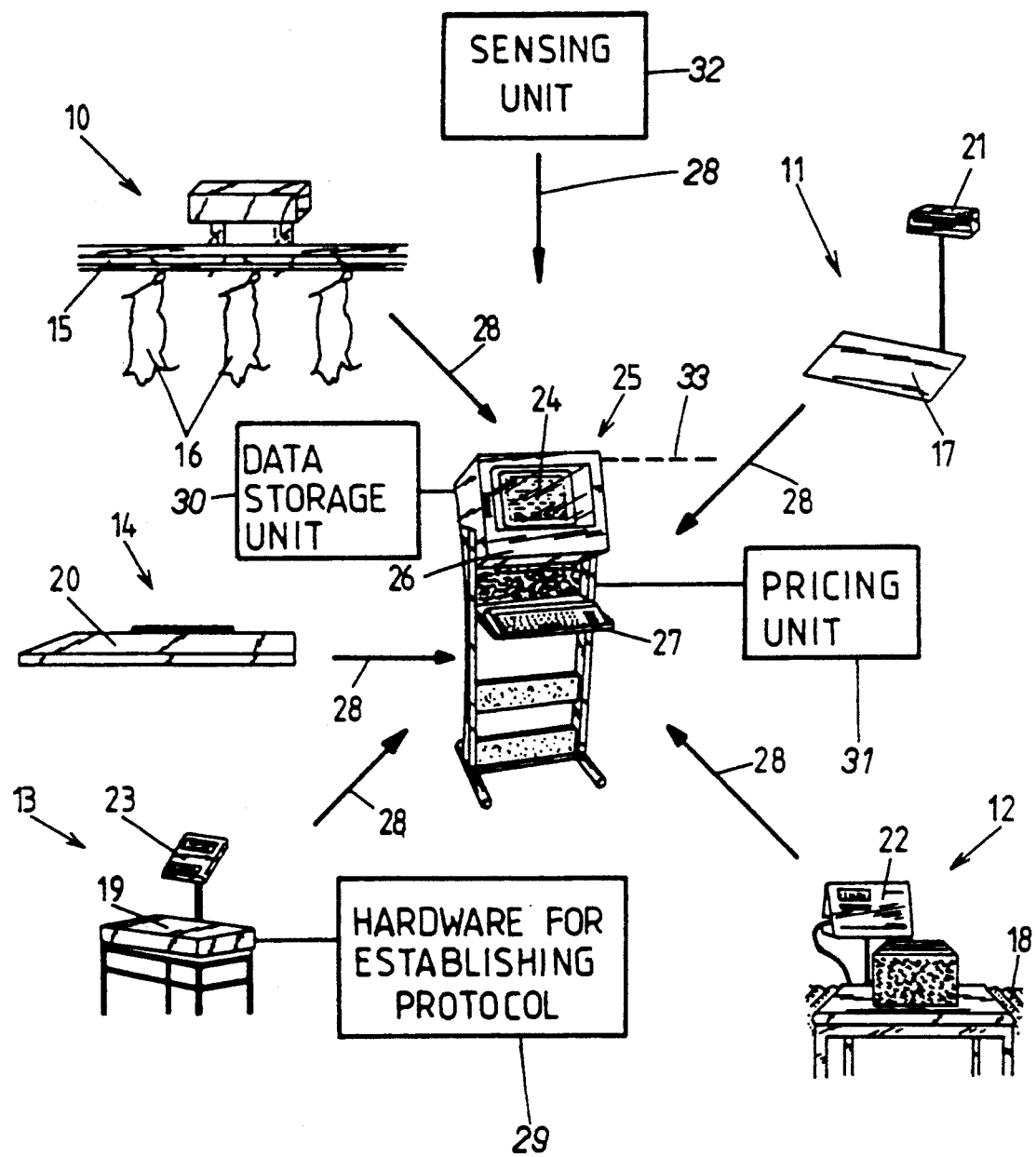

WEIGHING ARRANGEMENT FOR A MEAT PACKING FACILITY

BACKGROUND OF THE INVENTION

The invention relates generally to a facility for manipulating commodities.

More particularly, the invention relates to a facility having an arrangement for determining the weights of commodities. If necessary or expedient, the facility may be provided with a pricing device which can transfer weight data to commodities ready for shipment and/or with a central processor which can perform bookkeeping functions. The pricing unit may include a printer for printing price labels.

As a rule, facilities such as plants have a plurality of scales for weighing arriving goods and parts as well as the finished goods and parts produced therefrom. Each scale is provided with an indicator which can be read by an operator. The operator can thus read the weight data obtained by the scale and either retain or forward the data. The weight data can be retained by making a note thereof. Forwarding of the weight data can be accomplished by typing the data into a computer or a central processor. A pricing device in the form of a printer of price labels can be associated with the computer or the central processor. In the event that the weight data are entered in a central processor, these data can also be retained in the processor for bookkeeping purposes.

The scales require a large number of personnel and, in addition, can give rise to many errors because there is no assurance that all of the weighing procedures will be detected. In order to detect all of the weighing procedures, it has accordingly been proposed to directly connect all of the scales with the central processor. However, the installation remains very large and expensive since each scale retains its own indicator and must be individually calibrated.

SUMMARY OF THE INVENTION

It is an object of the invention to provide a facility which enables substantially all of the weight data of commodities in the facility to be detected relatively easily and inexpensively.

Another object of the invention is to provide a facility having a weighing arrangement which can be of relatively simple construction and good reliability.

An additional object of the invention is to provide a method which makes it possible to detect virtually all weight data of the commodities in a facility relatively readily and economically.

The preceding objects, as well as others which will become apparent as the description proceeds, are achieved by the invention.

One aspect of the invention resides in a facility for manipulating commodities. The facility comprises a plurality of scales for weighing the commodities; a central station including at least one personal computer; means for transmitting weight data from the scales to the central station or its personal computer; and means for identifying the weight data from each of the scales.

The central station, which can be provided with a rack for the personal computer, may serve to display, monitor, store and process the weight data from the scales. The central station or personal computer may also provide a bookkeeping function.

The transmitting means preferably comprises means for directly connecting the scales to the central station.

The identifying means may comprise means, e.g., suitable hardware, for generating a protocol for each of the scales. Each such protocol can include weight data from the respective scale in digital form and identifying data for the respective scale.

Scales in the form of overhead trolley track scales, floor scales, stand-mounted scales, continuous-weighing scales and platform scales can be connected to the central station. In general, all forms and types of scales can be connected to the central station or its personal computer in simple fashion. The central station or personal computer can be provided with means for monitoring the weight data from the scales and such monitoring means may comprise means for displaying the weight data determined by the individual scales. The displaying means may include a screen, e.g., a monitor, so that the weight data from the scales can readily be visualized.

The central station or personal computer can be equipped with control means for selectively causing the weight data from either a single one of the scales or from a plurality of the scales to be displayed. The control means may, for instance, take the form of a keyboard. By appropriate manipulation of the keyboard, it is thus easily possible to individually display the weight data from a particular scale or, alternatively, to display the weight data from two or more of the scales simultaneously.

The central station or personal computer can further include means for pricing commodities which are ready to be shipped, and the pricing means may comprise a printer for price labels or tags. This allows commodities which are in condition for shipment to be provided with a price label or tag in a simple manner. If necessary or expedient, the price labels or tags can exhibit the weight and nature of a commodity in addition to the price.

The keyboard can be used to enter various types of data in the personal computer. The pricing means can be coupled to the personal computer so that data entered in the computer can be sent to the pricing means. Thus, for example, by entering prices in the personal computer, the pricing means can be supplied with appropriate pricing data.

The central station or personal computer can additionally be provided with means for storing and subsequently retrieving the weight data from the scales. This enables the weight data to be retained as desired. If necessary or expedient, the storing means can be designed so as to permit the weight data to be stored on diskettes.

In addition to the scales, the facility can include one or more other devices for sensing the commodities. By way of example, a meat packing facility may have a device for grading meat and a device for measuring the temperature of meat. Similarly to the scales, these other devices can be connectible to the central station or its personal computer. The central station can accordingly easily be used for displaying, monitoring, storing and processing not only weight data from the scales but also data from additional sensing devices such as a device for grading meat or a device for measuring the temperature of meat.

The facility of the invention can advantageously be a meat packing facility. The scales which are connectible to the central station or its personal computer are then of the type employed in the meat packing industry and are used to obtain weight data for slaughtered animals or parts thereof. All weight data relating to an animal, from the weight of the animal before slaughter to the weights of parts of the animal following slaughter, can here be determined in a simple manner.

The personal computer of the central station can be coupled to one or more other personal computer installations via an EDV connection. This makes it readily possible to set up networks or links internally of the facility. Furthermore, a link to branch locations, e.g., via modem, for the purpose of communicating with such locations can be established wherever convenient.

In accordance with the invention, the weighing operations in the facility can be substantially improved and simplified inasmuch as only a single operator is required for the central station. All of the weighing procedures can be reliably detected. It is no longer necessary to assign an indicator to each individual scale since the weight data obtained are observable at the central station. Due to the fact that the central station has at least one personal computer, these weight data can be reliably monitored, stored and held in readiness for further processing. If necessary or expedient, the weight data, as well as data derived therefrom by processing, can be used to control other operations. The protocol which enters the central station or personal computer from a particular scale and includes weight data from the scale in digital form plus identifying data for the scale can be accurately identified by the identifying data. Hence, it is possible to determine precisely which scale generated the weight data. Dates and times can also be indicated. Inasmuch as the individual scales need no longer have their own indicators, calibration can be performed particularly simply because such calibration can be carried out centrally for all of the scales at the central station or central personal computer.

The novel features which are considered as characteristic of the invention are set forth in particular in the appended claims. The improved facility itself, however, both as to its construction and its mode of operation, will be best understood upon perusal of the following detailed description of certain specific embodiments when read in conjunction with the accompanying drawing.

BRIEF DESCRIPTION OF THE DRAWING

The single FIGURE schematically illustrates a facility having a weighing arrangement in accordance with the invention.

DESCRIPTION OF THE PREFERRED EMBODIMENTS

The sole FIGURE shows a meat packing facility containing a weighing arrangement with several different types of scales 10,11,12,13,14 used in the meat packing industry. The scale 10 is an overhead trolley track scale, and several commodities in the form of hog halves 16 to be weighed are suspended from an overhead trolley track 15. The scale 11 is a floor scale and has a platform 17 on which commodities to be weighed are placed. The scale 12 is a continuous-weighing scale and is disposed in a transporting mechanism 18 for commodities to be weighed. During transport by the transporting mechanism, the commodities to be weighed pass through the continuous-weighing scale 12. The scale 13 is a stand-mounted scale and has a platform 19 on which commodities to be weighed are placed. The scale 14 is a platform scale and includes a platform 20 which supports commodities to be weighed.

The floor scale 11 has an indicator 21, the continuous-weighing scale 12 has an indicator 22 and the stand-mounted scale 13 has an indicator 23. However, the indicators 21,22,23 can be dispensed with, and the weight data obtained from the floor scale 11, the continuous-weighing scale 12 and the stand-mounted scale 13 can be displayed on a common display unit as is the case for the weight data from the overhead trolley track scale 10 and the platform scale 14. The common display unit is here the screen of a monitor 24. The monitor 24 constitutes part of a central station 25 containing a rack. The central station 25 further includes at least one personal computer 26 and at least one keyboard 27. The monitor 24, personal computer 26 and keyboard 27 are all mounted on the rack of the central station 25.

As indicated by the arrows 28, each of the scales 10,11,12,13,14 is connected to the central station 25 by a suitable conductor which serves to transmit weight data from the respective scale 10,11,12,13,14 to the central station 25. The connection between the scales 10,11,12,13,14 and the central station 25 can be direct. The scales 10,11,12,13,14 are provided with or connected to hardware 29 functioning to establish protocols for transmission to the central station 25. The protocol for each scale 10,11,12,13,14 includes the weight data generated by the respective scale 10,11,12,13,14 as well as identifying data for the respective scale 10,11,12,13,14. The weight data of a protocol is in digital form. The identifying data in a protocol makes it possible to identify the scale which generated the corresponding weight data.

A single central station 25 is thus associated with the five scales 10,11,12,13,14 of the meat packing facility in simple fashion. At the central station 25, a single operator can switch on, switch off, control and monitor all five of the connected scales 10,11,12,13,14. By means of the keyboard 27, the weight data from a single one of the scales 10,11,12,13,14, or from a plurality of the scales 10,11,12,13,14, or from all of the scales 10,11,12,13,14 can immediately be made visible on the monitor 24. The central station 25 can be provided with or connected to a data storage unit 30 which allows the weight data, as well as data derived therefrom by processing, to be stored and subsequently retrieved. The data storage unit 30 may include a memory and/or an arrangement for handling diskettes.

Additional data, e.g., prices, can be entered in the personal computer 26 via the keyboard 27, and the weight data obtained from the scales 10,11,12,13,14 can be processed with such additional data. The weight data and/or the data derived therefrom by processing can be used to control other devices of the meat packing facility. For instance, the transporting mechanism 18 and, in particular, its non-illustrated switches, can be controlled in dependence upon weight.

The central station 25 can be further provided with or connected to a pricing unit 31 which may include a printer. By way of example, the pricing unit 31 can supply a commodity which is ready for shipment with a printed tag or label stating the weight, price, nature of the commodity, and so on.

In addition to the scales 10,11,12,13,14, other sensing units of the meat packing facility can be connected to the central station 25 if necessary or expedient. For instance, a sensing unit for determining the grade of meat and/or a sensing unit for measuring the temperature of meat can be connected to the central station 25. A sensing unit additional to the scales 10,11,12,13,14 is identified by the reference numeral 32 and, similarly to the scales 10,11,12,13,14, is connected to the central station 25 by a conductor 28.

The personal computer 26 of the central station 25 can be connected to one or more other personal computer installations via an EDV connection. This allows internal networks or links to be easily set up in the facility. Moreover, links to branch locations for the purpose of communicating with such locations, e.g., by modem, can be established wherever convenient.

The illustrated embodiment only exemplifies how the invention may be realized and the invention is not limited to such embodiment. Rather, numerous other embodiments, as well as numerous modifications, are possible.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A facility for manipulating commodities, comprising:
    a plurality of scales for weighing said commodities, said scales including means for generating electronic data representing commodity weight and data identifying said scales, respectively, and wherein said scales are devoid of readout means;
    at least one sensing device other than said scales for sensing the processing of said commodities, said device including means for generating electronic commodity processing data selected from grade data and temperature data;
    a central station including computer means for receiving said weight data, said scale identification data, and said commodity processing data, and for processing said data, wherein said central station further comprises means for calibrating all or a plurality of said scales; and
    transmission means for conveying said weight data, said associated scale identification data, and said commodity processing data, respectively, from each scale and sensing device to said central station, where said data are read by an operator.

2. The facility of claim 1, wherein said station is provided with a rack for said computer.

3. The facility of claim 1, wherein said transmission means includes means for directly connecting said scales to said station.

4. The facility of claim 1, wherein said means for generating data includes means for generating a protocol for each of said scales, each protocol including said weight data from the respective scale in digital form and said identifying data for the respective scale.

5. The facility of claim 1, wherein at least one of said scales is selected from the group consisting of overhead trolley track scales, floor scales, stand-mounted scales, continuous-weighing scales and platform scales.

6. The facility of claim 1, wherein said station further includes means for monitoring the weight data from said scales.

7. The facility of claim 6, wherein said monitoring means comprises means for displaying the weight data from said scales.

8. The facility of claim 7, wherein said displaying means comprises a screen.

9. The facility of claim 8, wherein said screen constitutes part of a monitor.

10. The facility of claim 7, wherein said station further includes control means for selectively causing display of the weight data from a plurality of said scales or only one of said scales.

11. The facility of claim 10, wherein said control means comprises a keyboard.

12. The facility of claim 1, further comprising means for pricing the commodities, and means for connecting said pricing means with said central station.

13. The facility of claim 12, wherein said central station further includes control means for entering pricing data in said computer, said pricing means being coupled to said computer means.

14. The facility of claim 13, wherein said control means comprises a keyboard.

15. The facility of claim 1, wherein said central station further includes means for storing and subsequently retrieving weight data from said scales.

16. The facility of claim 1, wherein said scales are employed in the meat packing industry.

17. The facility of claim 1, further comprising an EDV connection for establishing communication between said computer and at least one other personal computer means.

18. A facility as in claim 1, wherein the weight data generated by at least two of said plurality of scales is interrelated, said computer means determining the interrelationship between said weight data of said respective scales and manipulating said data for evaluating the processing of said commodities by said facility.

19. A facility as in claim 1, wherein said computer means include a personal computer.

20. A facility for manipulating commodities, comprising:
    a plurality of scales for weighing said commodities, said scales including means for generating electronic data representing commodity weight and data identifying said scales, respectively;
    at least one sensing device other than said scales for sensing the processing of said commodities, said device including means for generating electronic commodity processing data, wherein said commodity processing data comprise data selected from grade data and temperature data;
    a central station including computer means for receiving said weight data, said scale identification data, and said commodity processing data, and for processing said data; and
    transmission means for conveying said weight data, and said associated scale identification data, and said commodity processing data, respectively, from each scale and sensing device to said central station.

* * * * *

UNITED STATES PATENT AND TRADEMARK OFFICE
CERTIFICATE OF CORRECTION

PATENT NO. : 5,306,875
DATED : April 26, 1994
INVENTOR(S) : Peter SCHIMITZEK

It is certified that error appears in the above-indentified patent and that said Letters Patent is hereby corrected as shown below:

On THE TITLE PAGE:

Under Field [19] for "United States Patent", delete "Schmitzek" and substitute --Schimitzek--. In Field [75] for "Inventor", delete "Schmitzek" and substitute --Schimitzek--.

Signed and Sealed this

Twenty-third Day of August, 1994

*Attest:*

BRUCE LEHMAN

*Attesting Officer*  *Commissioner of Patents and Trademarks*